Dec. 20, 1966  H. C. SWIFT  3,292,740
AUTOMATIC BRAKE ADJUSTING MECHANISM
Filed Nov. 18, 1964  3 Sheets-Sheet 2

INVENTOR.
Harvey C. Swift,
BY
Harness, Dickey & Pierce
ATTORNEYS.

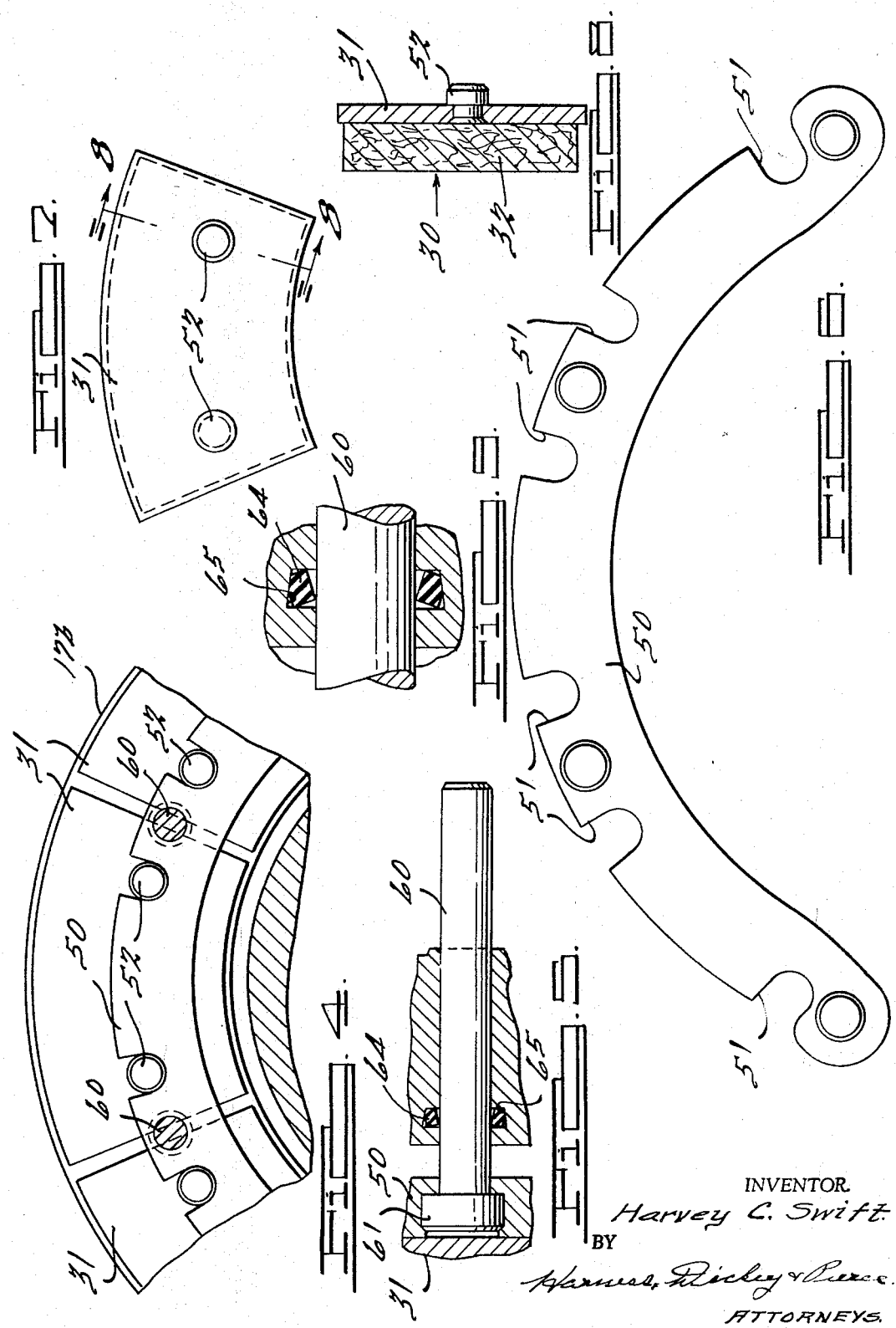

United States Patent Office 3,292,740
Patented Dec. 20, 1966

3,292,740
AUTOMATIC BRAKE ADJUSTING MECHANISM
Harvey C. Swift, Birmingham, Mich., assignor to Kelsey-Hayes Company, Romulus, Mich., a corporation of Delaware
Filed Nov. 18, 1964, Ser. No. 412,204
3 Claims. (Cl. 188—73)

This invention relates to disk brakes for vehicles, and, more particularly, to means for automatically adjusting the brakes when the linings on the brake shoes become worn.

One of the objects of this invention is to provide wholly automatic adjusting means of this type which is controlled by excessive movement of the brake shoes due to wear on the linings thereof and wherein the caliper member is re-positioned as the brake linings wear.

Another object of the invention is to provide a brake construction in which means is provided for mounting the brake shoes at one side of the brake whereby they may be simultaneously positioned properly with respect to the brake disk and adjusted and actuated in unison.

Another object is to provide a disk brake construction in which the caliper member extends through the center portion of the brake disk so that a larger brake disk and consequently a larger braking surface may be employed.

Another object of the invention is to provide a brake construction which is of rugged, sturdy construction and which may be economically manufactured, may be quickly and easily installed and in which maintenance costs are reduced to a minimum.

The above and other objects of the invention are attained by a construction comprising a caliper member which is mounted on parallel links pivotally connected to the axle so as to move substantially rectilinearly. When the caliper is moved an excessive amount, due to wear on the brake linings, the caliper is held in this new position by a dog or pawl and ratchet mechanism interposed between the links and axle. This maintains the caliper in proper relation to the adjacent brake shoes. The opposite brake shoes are mounted on a brake shoe carrier which is in the form of a segmental plate and this brake shoe carrier is automatically adjusted to take up brake lining wear by one or more, preferably three, studs or positioning rods slidably mounted in the caliper, the movement of which is controlled by O-ring type packings. The brake shoes are interchangeable and are removably mounted on the caliper and brake shoe carrier by studs engaging recesses formed in the upper edges of said caliper and brake shoe carrier.

The various objects and advantages, and the novel details of construction of one commercially practical embodiment of the invention, will become more apparent as this description proceeds, especially when considered in connection with the accompanying drawings, in which:

FIGURE 3 is a detail section taken on line 3—3 in FIGURE 2;

FIGURE 4 is a fragmentary sectional elevational view taken substantially on the plane indicated by line 4—4 of FIGURE 2, looking in the direction of the arrows;

FIGURE 5 is a detail sectional view on line 5—5 in FIGURE 2;

FIGURE 6 is an elevational view of the brake shoe carrier plate;

FIGURE 7 is an elevational view of one of the brake shoes;

FIGURE 8 is a sectional view on line 8—8 in FIGURE 7; and

FIGURE 9 is a detail view of the O-ring type seal for the positioning rods.

Figure 1:
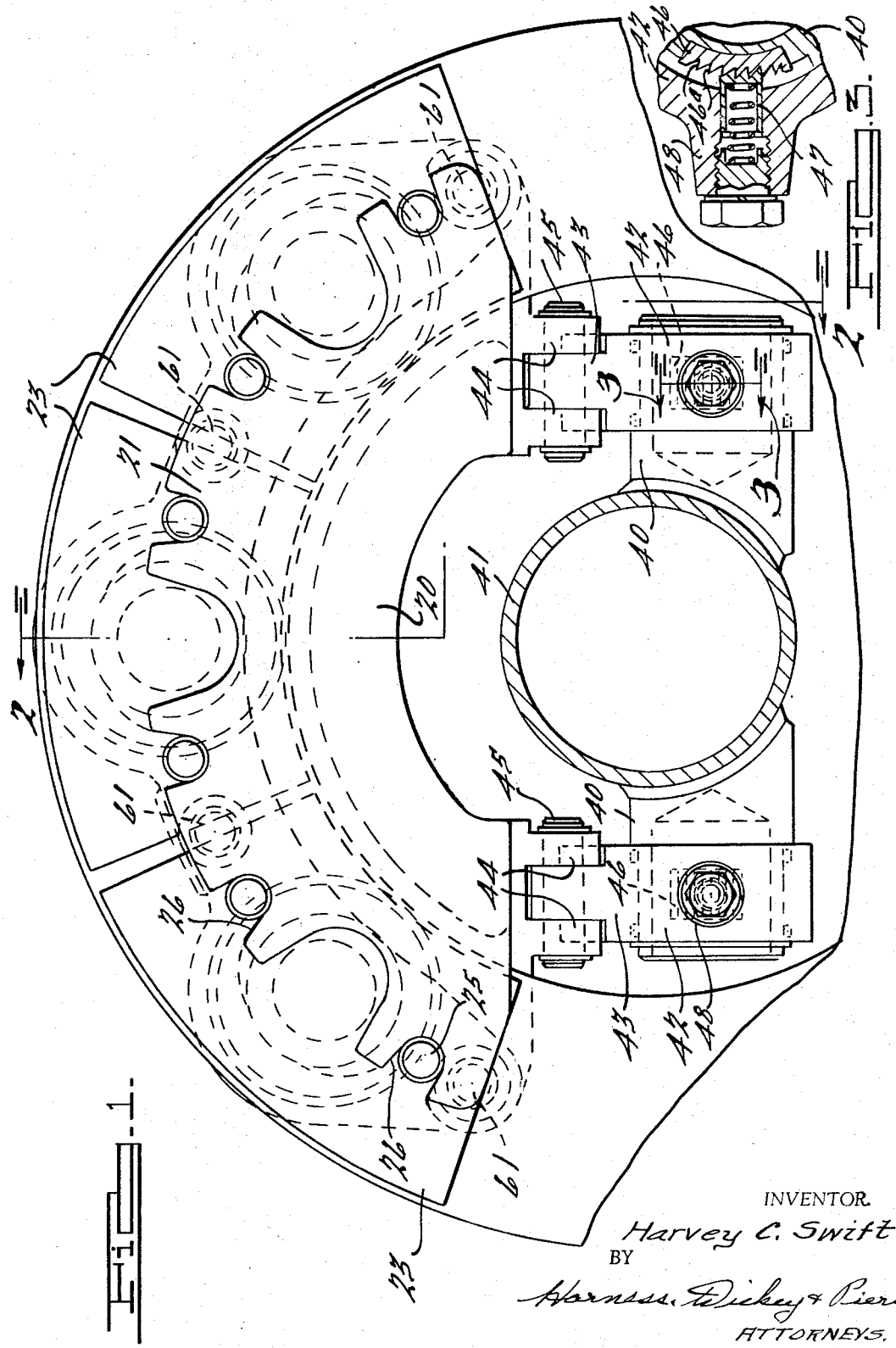
FIGURE 1 is an elevational view, partly in section, showing a brake constructed in accordance with this invention, with the wheel removed.

The brake of this invention is shown as being associated with a vehicle wheel having a rim 10 and a wheel body 11 secured to the axle flange 12 by means of studs or bolt and nut assemblies 13.

Also secured to the axle flange 12, or an adjacent portion of the wheel assembly, by means of bolts or the like 14 is a torque member or brake supporting member 15 in the form of a disk-like member which is connected by means of bolts 16 to a brake disk 17. The brake disk is preferably provided with spaced walls 17a and 17b connected by spaced webs 18 to provide a plurality of apertures therebetween. The webs 18 function as fan blades and serve to move cooling air in a radially outward direction between the walls 17a and 17b when the brake is rotated. This serves to reduce the heat generated by the engagement of the brake shoes with the brake disk, as will be apparent.

The brake disk 17 is provided with a central or axial opening 19 through which a caliper member 20 extends. The caliper member 20 extends through the central portion of the brake disk, instead of around the periphery thereof, so that a larger brake disk may be employed providing greater braking surfaces, as will be obvious.

The caliper member 20 is in the form of a C-shaped yoke member. The yoke member 20 straddles a portion of the inner periphery of the opening 19 in the brake disk 17.

The caliper member 20 is provided with one leg or flange 21 which engages the outer brake shoes 22, each of which consists of a backing plate 23 and a brake lining 24. The backing plate 23 is provided with one or more, here shown as two, studs 25 which engage in open-ended recesses 26 in the leg 21 of the caliper. Thus, the brake shoes are removably secured to the leg 21 of the caliper member 20.

The other leg 27 of the caliper is formed with cylinder portions 28 to receive pistons 29 for actuating the other brake shoes, indicated generally by the reference character 30. These are the inner brake shoes and each comprises a backing plate 31 and lining 32.

Figure 2:
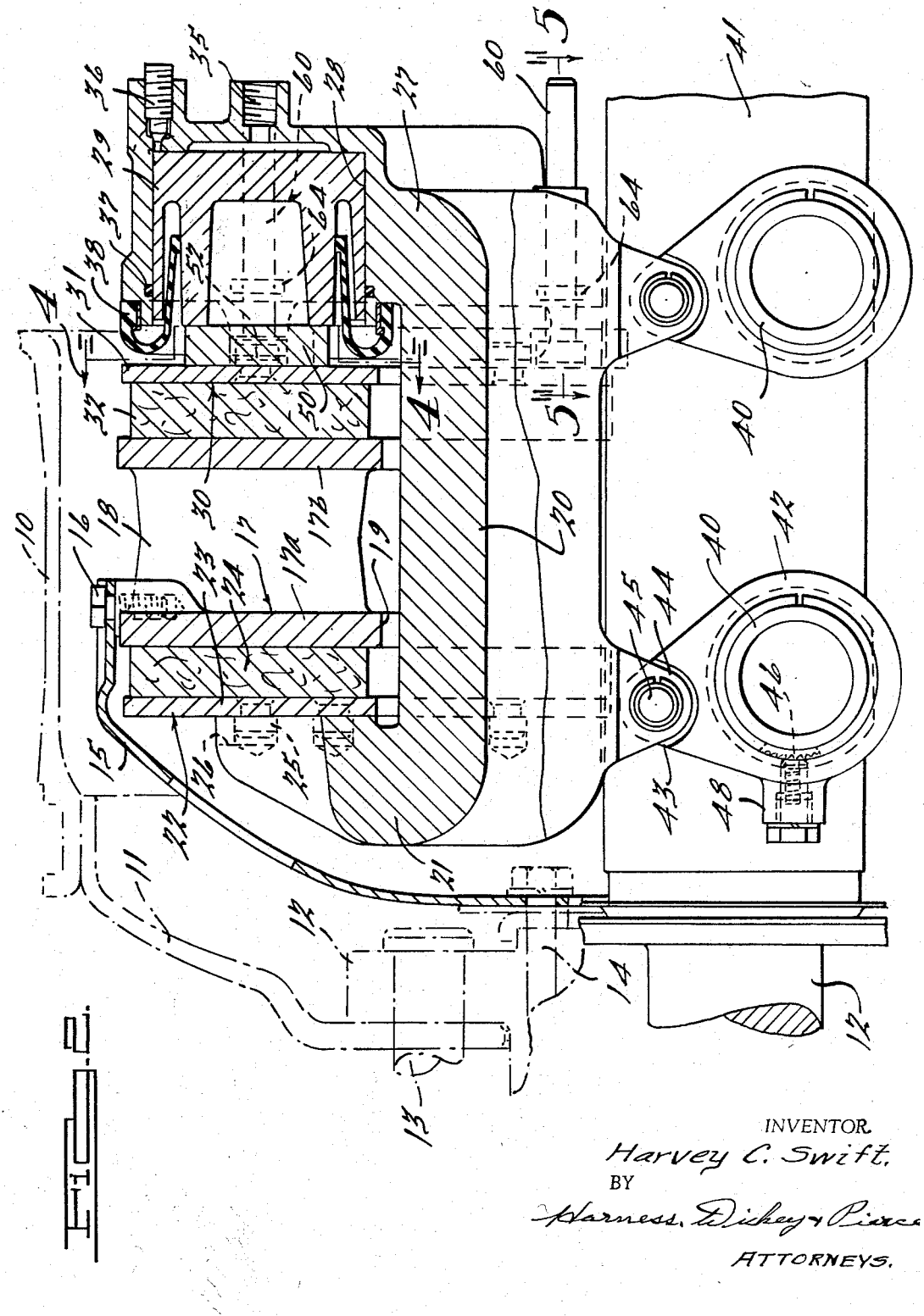
FIGURE 2 is an enlarged fragmentary vertical sectional view taken substantially on the plane indicated by line 2—2 in FIGURE 1, with the wheel indicated by broken lines.

The brake actuating pistons 29 are adapted to move the brake shoes 30 toward the brake disk 17 and the reaction of the piston moves the yoke or caliper member 20 to the right, as viewed in FIGURE 2, to apply the other brake shoes to the brake disk, as will be apparent.

In the embodiment of the invention herein illustrated there are shown three brake shoes 22 and three brake shoes 30. Hence, three brake actuating pistons 29 are employed.

Fluid is introduced behind the pistons 29 by means of a fluid pressure supply conduit 35 and a bleeder opening 36 is provided for bleeding air from the system.

Each piston is preferably provided with an O-ring type annular seal 37. This restricts the free movement of the piston and also seals the periphery thereof. A flexible annular boot 38 is provided for each piston which is formed of rubber, canvas, or any suitable flexible material, to close the clearance between the piston 29 and the cylinder 28 to exclude therefrom dust or other foreign material.

When the pistons 29 are moved to the left, as viewed in FIGURE 2, the right-hand or inner brake shoes 30 will be moved into engaging relation with the brake disk 17 and through the reaction of the caliper or yoke member 20, a brake applying action is applied to the left-hand or outer brake shoes 22.

One of the objects of this invention is to automatically adjust the caliper 20 as the brake lining wears on the outer shoes 22. To accomplish this, trunnions 40 are rigidly secured to a stationary axle part 41. These trunnions 40 extend laterally in opposite directions, as shown in FIGURE 1. Two trunnions 40 are provided for each end of the caliper 20 in the embodiment of the invention herein illustrated.

Each trunnion has rotatably mounted thereon a sleeve member 42 which is pivotally connected by a link member 43 with a pair of ears 44 secured to the caliper member 20. A pin 45 passes through the end of each link member and the pair of ears 44 to pivotally secure the link member 43 to the caliper member.

As the brake shoe linings on the outer brake shoes 22 wear, the caliper 20 moves further to the right in order to properly apply pressure to these brake shoes. The caliper moves in a rectilinear direction and its movement is controlled by one or more dog or pawl and ratchet mechanisms, each in which consists of a ratchet 46 carried by the stationary trunnion 40 and a spring pressed dog or pawl 47 carried in a laterally extending portion 48 of the sleeve member 42. The teeth on the ratchet member 46 and on the pawl 47 are so arranged as to permit movement of the caliper to the right, as viewed in FIGURE 2, to take up any excess movement resulting from wear on the brake linings 24, but are provided with straight surfaces or abutment surfaces 46a which prevent the retrograde movement of the caliper 20. Thus, when the brake shoe linings 24 have worn sufficiently to cause excess movement of the caliper 20 to the right, as viewed in FIGURE 2, the sleeve 42 will be rotated sufficiently so that the teeth on the dog or pawl engage the next adjacent teeth on the ratchet 46 and hold the caliper 20 in its newly adjusted position. Thus, as the brake linings 24 wear, the caliper 20 is adjusted toward the right, as viewed in FIGURE 2, so that it will be always in position to properly engage the brake shoes 22.

Disposed between the pistons 29 and the inner brake shoes 30 is a segmental brake shoe carrier plate 50 which is shown in elevation in FIGURE 6. This carrier plate 50 is provided with pairs of open-end recesses 51 to receive studs 52 projecting from the backing plates 31 of the right-hand or inner brake shoes 30; see FIGURE 8. Thus, the inner brake shoes 30 are removably carried by the plate 50 and are interchangable with the outer shoes 22.

Means is provided for automatically adjusting the brake shoe carrier 50 and this consists of one or more, here shown as three, studs or positioning rods 60. Each stud or rod 60 is provided with a head 61 which is secured in a recess 62 in the carrier plate 50 by being staked or otherwise secured thereto.

The carrier plate 50 is automaticaly adjusted to take up brake lining wear by means of the positioning rods 60, as will be now pointed out. Each rod 60 is slidably mounted in the caliper and surrounding each rod 60 is an O-ring type member 64 which engages a recess 65 in the caliper 20. The seals 64 are usually not round in cross section, as is customary with O-ring seals, but are rectangular in shape, as shown in British Patent No. 726,809, and the recess 65 is irregularly shaped as shown in this patent. Thus, when the pistons 29 act to apply the brake shoes 30, if the movement is small, the rods 60 will rotate the seal 64 and no permanent adjustment will be imparted to the brake shoe carrier 50. When, however, the linings on the inner brake shoes become worn, and the carrier plate 50 partakes of excessive movement, the rods will be moved longitudinally of the caliper 20 and assume a new position with respect to the brake shoes to compensate for the wear on the lining.

It will be noted that the pistons 29 engage the brake shoe carrier plate 50 and, inasmuch as this plate carries the inner brake shoes 30, these shoes and this plate will be moved upon each application of the brakes. With the construction just described, the pistons 29 apply the inner brake shoes 30 through the carrier plate 50, which is always properly positioned according to the wear on the linings 32 of the inner brake shoes.

From the foregoing, it will be apparent that the brake shoes 22 and 30 are removably carried by the caliper and the brake shoe carrier plate 50 by having the studs 25 and 52 thereof engage in the recesses formed in these members. Thus, the shoes may be readily removed and the shoes are interchangeable.

The invention provides means for adjusting the caliper so as to compensate for wear on the liniings of the outer shoes 22. Also, the brake shoe carrier plate 50 is automatically adjusted to move the plate 50 to the left, as viewed in FIGURE 2, and thus take up wear on the linings 32 of the other brake shoes 30.

The invention is disclosed as employed with a brake involving six brake shoes and three pistons but, obviously, the invention may be employed with equal facility with smaller brakes involving two brake shoes or with larger brakes employing more than six brake shoes.

In any event, the invention of this application provides means for automatically making adjustments to compensate for the wear on all of the brake shoes and does this in a simple but effective manner.

While one commercially practical embodiment of the invention has been described and illustrated herein somewhat in detail, it will be understood that various changes may be made as may come within the purview of the accompanying claims.

What is claimed is:

1. A disk brake for a vehicle having a wheel, a disk which is rotatable with the wheel and is provided with braking surfaces on opposite sides thereof and a stationary member adjacent the disk, said brake comprising a housing member having first and second portions on opposite sides of the disk, a first brake shoe carried by said first housing member portion adjacent one braking surface of the disk, a second brake shoe disposed adjacent the other braking surface of the disk, a piston carried by said second housing member portion operable to press said second brake shoe against its adjacent disk braking surface and through reactive movement of said housing member to press said first brake shoe against its adjacent disk braking surface, a pair of links spaced apart in the direction of the axis of rotation of the disk, said links being pivotally mounted on said stationary member and being pivotally connected to said housing member to support said housing member for movement generally normal to the braking surfaces of the disk and an automatic adjuster mechanism arranged between at least one of said links and one of said members, said mechanism being operable to assume new positions as said brake shoes wear to maintain a predetermined maximum clearance distance between said first brake shoe and its adjacent disk braking surface, said mechanism having stop means positively limiting movement of said first housing portion away from said disk without limiting movement of said first housing portion toward said disk.

2. A disk brake for a vehicle having a wheel, a disk which is rotatable with the wheel and is provided with braking surfaces on opposite sides thereof and a stationary member adjacent the disk, said brake comprising a housing member having first and second portions on opposite sides of the disk, a first brake shoe carried by said first housing member portion adjacent one braking surface of the disk, a second brake shoe disposed adjacent the other braking surface of the disk, a piston carried by said second housing member portion operable to press said second brake shoe against its adjacent disk braking surface and through reactive movement of said housing member to press said first brake shoe against its adjacent disk braking surface, a pair of pivoted links spaced apart in the direction of the axis of rotation of the rotor, said links being pivotally mounted on said stationary member and being pivotally connected to said housing member to support said housing member for movement generally normal to the braking surfaces of the disk and a pawl and ratchet mechanism arranged between at least one of said links and one of said members, said pawl and ratchet mechanism being operable to assume new positions as said brake shoes wear to maintain a predetermined maximum clearance distance between said first brake shoe and its adjacent disk braking surface, said mechanism being effective to positively limit movement of said housing portion away from said disk without limiting movement of said first housing portion toward said disk.

3. A disk brake for a vehicle having a wheel, a disk which is rotatable with the wheel and is provided with braking surfaces on opposite sides thereof and a stationary member adjacent the disk, said brake comprising a housing member having first and second portions on opposite sides of the disk, a first brake shoe carried by said first housing member portion adjacent one braking surface of the disk, a second brake shoe disposed adjacent the other braking surface of the disk, a piston carried by said second housing member portion operable to press said second brake shoe against its adjacent disk braking surface and through reactive movement of said housing member to press said first brake shoe against its adjacent disk braking surface, a pair of pivoted links spaced apart in the direction of the axis of rotation of the rotor, said links being pivotally mounted on said stationary member and being pivotally connected to said housing member to support said housing member for movement generally normal to the braking surfaces of the disk, a plurality of ratchet teeth pivotal with at least one of said links, a pawl mounted on said stationary member and successively engageable with said ratchet teeth to maintain a predetermined maximum clearance distance between said first brake shoe and its adjacent disk brake surface, said pawl and ratchet teeth being arranged to positively limit movement of said first housing portion away from said disk without limiting movement of said housing toward said disk.

References Cited by the Examiner

UNITED STATES PATENTS

| | | | |
|---|---|---|---|
| 1,680,986 | 8/1928 | Harelik | 188—196 X |
| 2,472,697 | 6/1949 | Du Bois | 188—196 X |
| 2,531,341 | 11/1950 | Meador | 188—72 |
| 2,575,578 | 11/1951 | Bricker. | |
| 2,655,229 | 10/1953 | Eksergian | 188—73 X |
| 2,754,936 | 7/1956 | Butler | 188—73 |
| 3,165,173 | 1/1965 | Thirion | 188—73 |
| 3,199,635 | 8/1965 | Bessler et al. | 188—73 |

FOREIGN PATENTS

| | | |
|---|---|---|
| 221,315 | 4/1959 | Australia. |
| 1,319,419 | 1/1963 | France. |
| 806,919 | 1/1959 | Great Britain. |

FERGUS S. MIDDLETON, *Primary Examiner.*

MILTON BUCHLER, G. E. A. HALVOSA,
*Assistant Examiners.*